United States Patent
Anayama et al.

(10) Patent No.: US 9,434,189 B2
(45) Date of Patent: Sep. 6, 2016

(54) MOUNTED APPARATUS AND SYSTEM

(71) Applicant: CANON KABUSHIKI KAISHA, Tokyo (JP)

(72) Inventors: Daiki Anayama, Yokohama (JP); Tetsuo Kikuchi, Ayase (JP); Masakazu Nagashima, Yokohama (JP); Ryo Harigae, Koganei (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/859,564

(22) Filed: Sep. 21, 2015

(65) Prior Publication Data
US 2016/0089913 A1 Mar. 31, 2016

(30) Foreign Application Priority Data

Sep. 30, 2014 (JP) ................................. 2014-200727

(51) Int. Cl.
| | |
|---|---|
| B62B 3/04 | (2006.01) |
| B62B 5/04 | (2006.01) |
| B41J 13/10 | (2006.01) |
| F16M 11/42 | (2006.01) |
| F16M 11/24 | (2006.01) |

(52) U.S. Cl.
CPC ............... B41J 13/106 (2013.01); B62B 3/04 (2013.01); B62B 5/049 (2013.01); F16M 11/24 (2013.01); F16M 11/42 (2013.01)

(58) Field of Classification Search
CPC ............ B65H 1/266; B65H 2402/32; B65H 2405/111; B65H 2405/312; B65H 2405/1111; B65H 2405/1113; B60B 33/0039; B62B 3/04; B62B 5/049; B62B 2203/10; B62B 2203/60

USPC ........ 347/104, 105; 271/157, 162, 164, 213, 271/253; 414/343, 396, 401
See application file for complete search history.

(56) References Cited

U.S. PATENT DOCUMENTS

| | | | | |
|---|---|---|---|---|
| 5,161,933 | A | * 11/1992 | Stauber | .................... B62B 3/04 280/43.12 |
| 5,666,595 | A | 9/1997 | Sameshima et al. | |
| 5,816,723 | A | 10/1998 | Takahashi et al. | |
| 6,736,584 | B2 | * 5/2004 | Dehn | ................. B60B 33/0002 271/157 |
| 7,971,875 | B2 | * 7/2011 | Iino | .......................... B62B 3/04 271/213 |
| 2016/0090261 | A1 | 3/2016 | Nagashima et al. | |

FOREIGN PATENT DOCUMENTS

JP 2010-163257 A 7/2010

OTHER PUBLICATIONS

Copending, unpublished U.S. Appl. No. 14/939,030, filed Nov. 12, 2015, to Yoshiaki Suzuki et al.

* cited by examiner

*Primary Examiner* — Anh T. N. Vo
(74) *Attorney, Agent, or Firm* — Fitzpatrick, Cella, Harper & Scinto

(57) ABSTRACT

A mounted apparatus includes a base portion and a caster provided to the base portion. The caster moves along an installation surface, whereby the mounted apparatus is detachably attached to a mounting apparatus; in a state where the mounted apparatus is attached to the mounting apparatus, the base portion is disposed in a region where the base portion overlaps with a base portion of the mounting apparatus with respect to an mounting direction; and the base portion of the mounted apparatus is disposed at a position that does not interfere with the base portion of the mounting apparatus in a height direction.

12 Claims, 14 Drawing Sheets

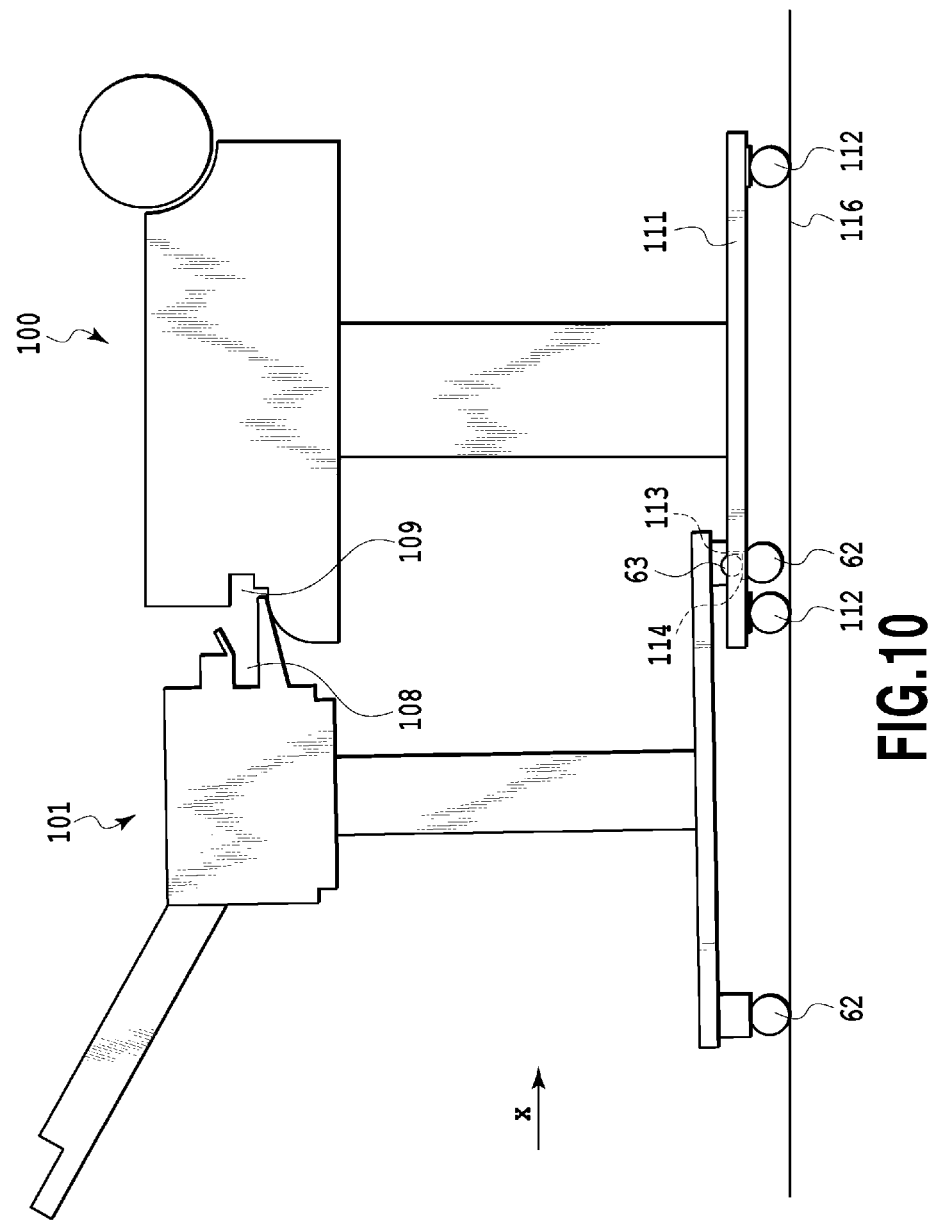

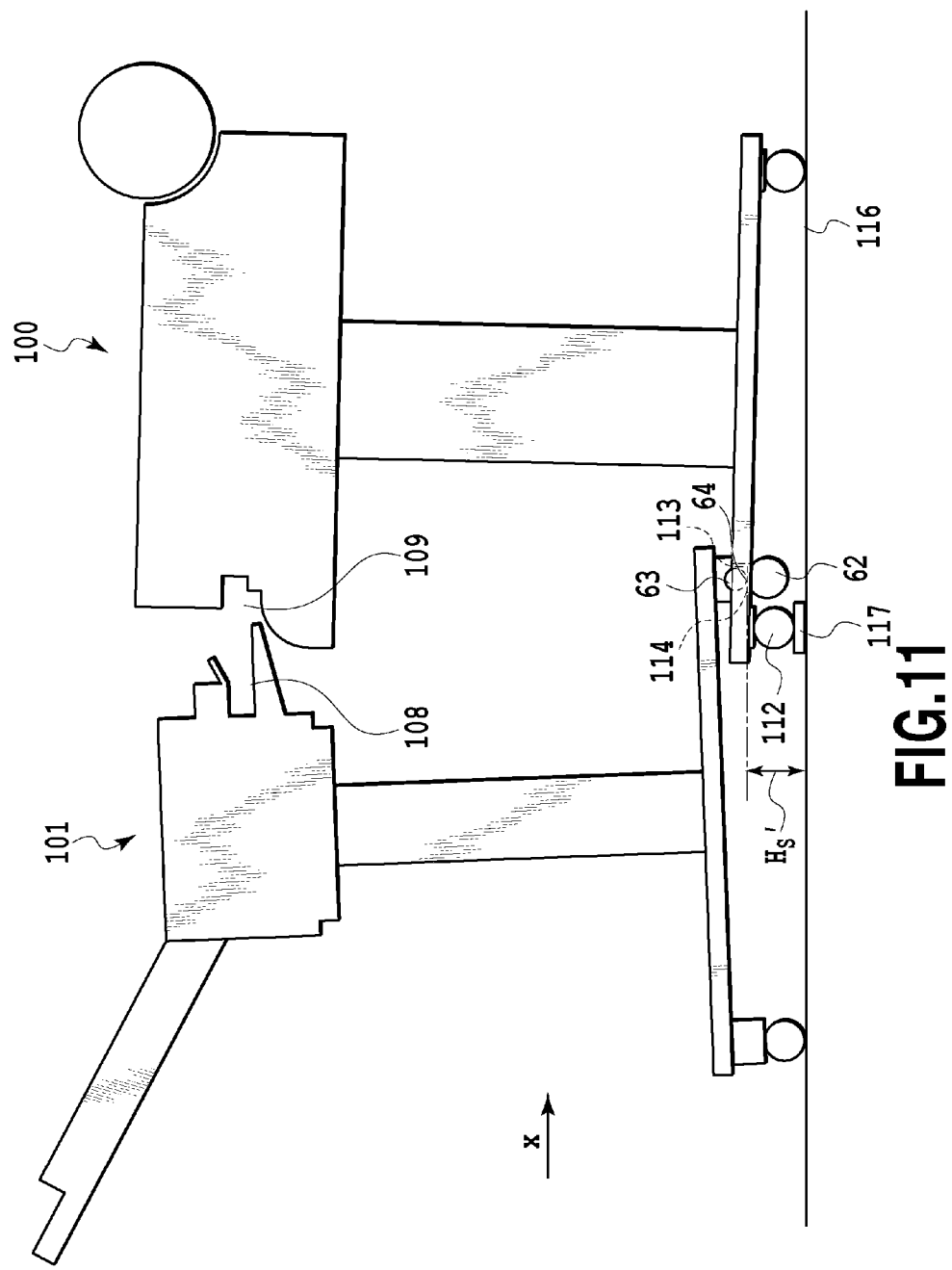

MOUNTED APPARATUS AND SYSTEM

BACKGROUND OF THE INVENTION

1. Field of the Invention

The present invention relates to a mounted apparatus that is moved along an installation surface, thereby being detachably attached to a mounting apparatus, and a system including the mounted apparatus and the mounting apparatus to which the mounted apparatus is detachably attached.

2. Description of the Related Art

In a large inkjet printer that performs printing on a medium such as a large sheet, there is known a loading apparatus, such as a stacker, for neatly loading media as a configuration of receiving the media as resulting objects discharged after printing. There are some media which are susceptible to damage or image transfer on the surface thereof when neatly loaded. Thus there is a configuration in which the stacker is provided separately from the printer body and is attached to the printer body in a detachable manner, and is detached as necessary so that the media can be discharged to another container such as a basket.

Such a stacker usually has casters that can move in all directions in order to facilitate movement. When an external force is applied to the stacker, the casters can rotate in a direction in which the external force is applied. In the case where the external force is applied in a diagonal direction when the stacker is about to be attached to the printer body, the stacker is obliquely positioned with respect to the printer body, which possibly makes it difficult for the stacker to be moved forward to a designed attachment position in the printer body. In such a case, there has been a problem in which a user needs to pull out the stacker again, correct its posture, and perform attachment operation again, thereby deteriorating operability.

In contrast to this, Japanese Patent Laid-Open No. 2010-163257 discloses a system that includes: a carriage that has casters attached thereto to thereby be able to move; and a mounting unit that has a guide member configured to guide insertion of the carriage and that holds the inserted carriage at an attachment position. The guide member has tip ends formed into a curved shape and has surfaces facing each other in such a manner that the distance between the surfaces decreases along the guide member towards the insertion direction of the carriage; and both side walls of the carriage guide the insertion of the carriage so that the carriage moves along the facing surfaces of the guide member.

SUMMARY OF THE INVENTION

In a case where a stacker (mounted apparatus) needs to be pulled out from the attachment position in a printer (mounting apparatus) having the stacker attached thereto, in order that a user may perform the minimum pulling-out operation, there is a demand for a configuration of rotating the stacker, and pulling the stacker out in a diagonal direction with respect to the stacker attachment posture.

However, with the configuration disclosed in Japanese Patent Laid-Open No. 2010-163257, it is not possible to rotate the carriage and diagonally pull the carriage out from the mounting unit because the facing surfaces of the guide member of the mounting unit (mounting apparatus) interfere with both side surfaces of the carriage (mounted apparatus).

Accordingly, an object of the present invention is to provide a mounted apparatus that can be pulled out in the diagonal direction with respect to the attachment posture by rotating the mounted apparatus from the attachment position in a mounting apparatus. Furthermore, another object of the present invention is to provide a system that includes the mounted apparatus and the mounting apparatus.

In order to achieve the objects described above, a mounted apparatus according to the present invention includes a base portion provided with a caster that moves along an installation surface to detachably attach the mounted apparatus to a mounting apparatus, wherein, in a state where the mounted apparatus is attached to the mounting apparatus, the base portion is disposed in a region where the base portion overlaps with a base portion of the mounting apparatus with respect to an mounting direction, and the base portion of the mounted apparatus is disposed at a position that does not interfere with the base portion of the mounting apparatus in a height direction.

According to the present invention, a user can rotate the stacker (mounted apparatus), and pull the stacker out from the printer (mounting apparatus) in a diagonal direction with respect to the attachment posture. Therefore, the user can create a required space in front of the printer body with a minimum operation.

Further features of the present invention will become apparent from the following description of exemplary embodiments (with reference to the attached drawings).

BRIEF DESCRIPTION OF THE DRAWINGS

FIG. 10 is a side view illustrating the printer and the stacker according to the second embodiment in the case where they are attached to each other;

FIG. 11 is a side view illustrating the printer and the stacker according to the second embodiment in the case where they are attached to each other and they are on a convex portion on a floor surface;

DESCRIPTION OF THE EMBODIMENTS

Figure 1:
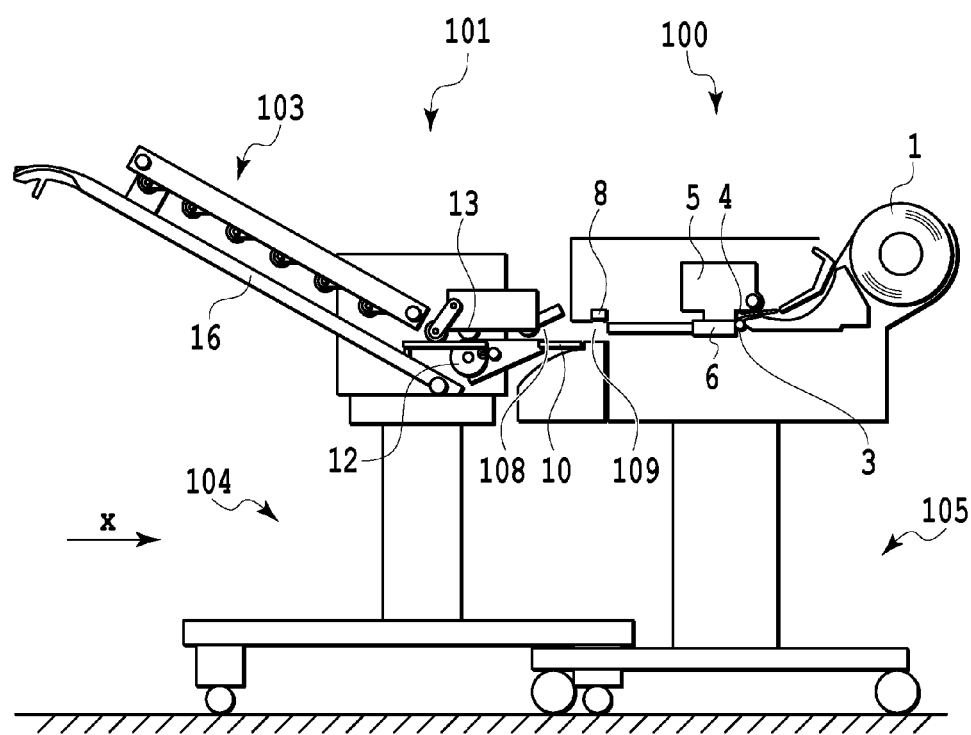
FIG. 1 is a schematic cross-sectional view illustrating a printer and a stacker according to a first embodiment.

Hereinafter, an embodiment according to the present invention will be described with reference to the drawings. In the drawings, the same reference signs represent the same or corresponding constituting elements. The embodiment according to the present invention will be described by giving a stacker as an example of a mounted apparatus (first apparatus) and giving a printer as an example of a mounting apparatus (second apparatus).

A first embodiment according to the present invention will be described with reference to the drawings. FIG. 1 is a schematic cross-sectional view illustrating an inkjet printer (hereinafter, also simply referred to as a printer) 100 (mounting apparatus) and a stacker 101 (mounted apparatus) according to the present invention connected to the inkjet printer.

The printer 100 includes an operation unit (not illustrated) for operating the printer 100. The operation unit has various switches. Commands such as the width of a sheet 1, online/offline of the printer 100, and printing instructions are given using these switches.

The sheet 1 as a medium, which is an object to be printed, is set in the form of being wound in a roll state on the printer 100. The sheet 1 is supplied to the inside of the printer 100 in a flat form in such a manner that the sheet is fed from the outer periphery of the rolled portion.

The printer 100 holds the sheet 1, supplied therein, between a printer conveying roller 3 and a printer pinch roller 4 which serve as a conveying unit, and conveys the sheet 1 to the upper surface of a platen 6 by rotation of the printer conveying roller 3. A head 5 that serves as a printing unit and ejects ink is disposed at a position facing the upper surface of the platen 6.

The platen 6 has a number of suction holes formed thereon for preventing the sheet from floating by causing the sheet to be sucked onto the platen 6. A duct (not illustrated) that communicates with the suction holes of the platen 6 is disposed below the platen 6, and a suction fan (not illustrated) that communicates with the duct is disposed below the duct, whereby the sheet is sucked onto the upper surface of the platen 6 with suction of the suction fan. The head 5 ejects ink to print an image, on the basis of image information, on a portion positioned in an image forming region of the sheet placed on the upper surface of the platen 6.

The sheet having the image printed thereon is further conveyed by the conveying unit, and is discharged from a printer opening 109 to the outside of the printer 100. The stacker 101 that carries the sheet after being printed is disposed on the downstream side of the printer 100 in the sheet conveying direction. The sheet discharged from the printer opening 109 passes through a joint portion 10 having a form suitable for delivery and receipt, and is conveyed into the stacker 101 from a stacker opening 108.

Once the sheet having the image printed thereon reaches the stacker 101, a conveying roller 12 of the stacker 101 starts to rotate. The sheet is held, by conveying force of the printer 100, between a conveying roller 12 and a pinch roller 13 which serve as a convey unit of the stacker 101, and then, the sheet is conveyed to a tray unit 103.

After completing printing of the image, the sheet is conveyed to a cutting position, and is cut into a predetermined length by a cutter 8 of the printer 100. The sheet cut into the predetermined length, is discharged to a tray 16 of the tray unit 103 by the conveying roller 12 of the stacker 101.

Figure 2:
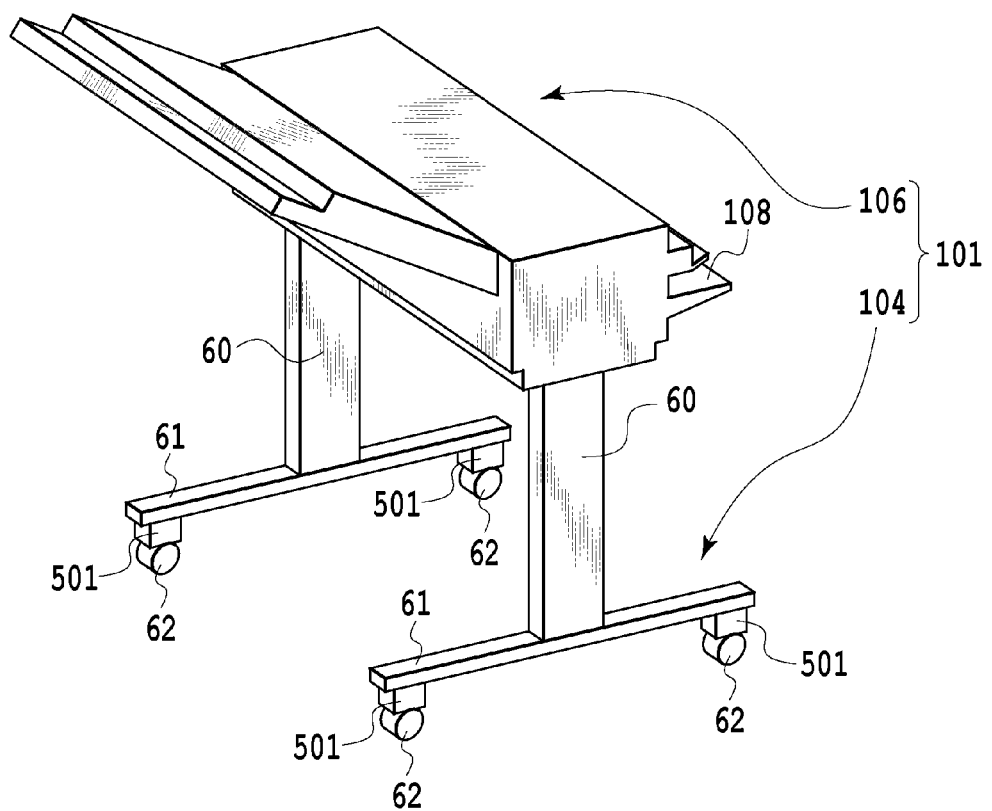
FIG. 2 is a perspective view illustrating the stacker according to the first embodiment.

Next, the configuration of the stacker 101 will be described with reference to FIG. 2. FIG. 2 is a perspective view illustrating the stacker 101. As illustrated in FIG. 2, the stacker 101 is constituted of a stacker unit 106 and a stacker stand unit 104.

The stacker unit 106 is provided with the stacker opening 108 from which the sheet is delivered. The stacker unit 106 is disposed on the stacker stand unit 104 that can freely move on a floor surface that is an installation surface for the stacker 101, and can freely move on the floor surface through user operations.

The stacker stand unit 104 has stacker legs 60 disposed on the right and the left of the stacker unit 106 in such a manner that the stacker opening 108 provided in the stacker unit 106 has the same height as that of the printer opening 109 of the printer 100 illustrated in FIG. 1.

In order to ensure stability, a stacker foot 61 (base portion) having a sufficient length in the horizontal direction is connected in the lower part of each of the stacker legs 60. A position adjusting unit 501 that can adjust the height of the stacker foot 61 from the floor surface is disposed at both end portions of each of the stacker feet 61 in order to deal with uneven states of the floor surface. A stacker caster 62 that has a rotational structure and moves by rolling on the floor surface is disposed at the bottom surface portion of the position adjusting unit 501. Therefore, the number of the position adjusting units 501 that are provided is four in total in the stacker stand unit 104, and correspondingly, the number of the stacker casters 62 that are provided is four in total. Each of the stacker casters 62 can move in all directions.

Figure 3:
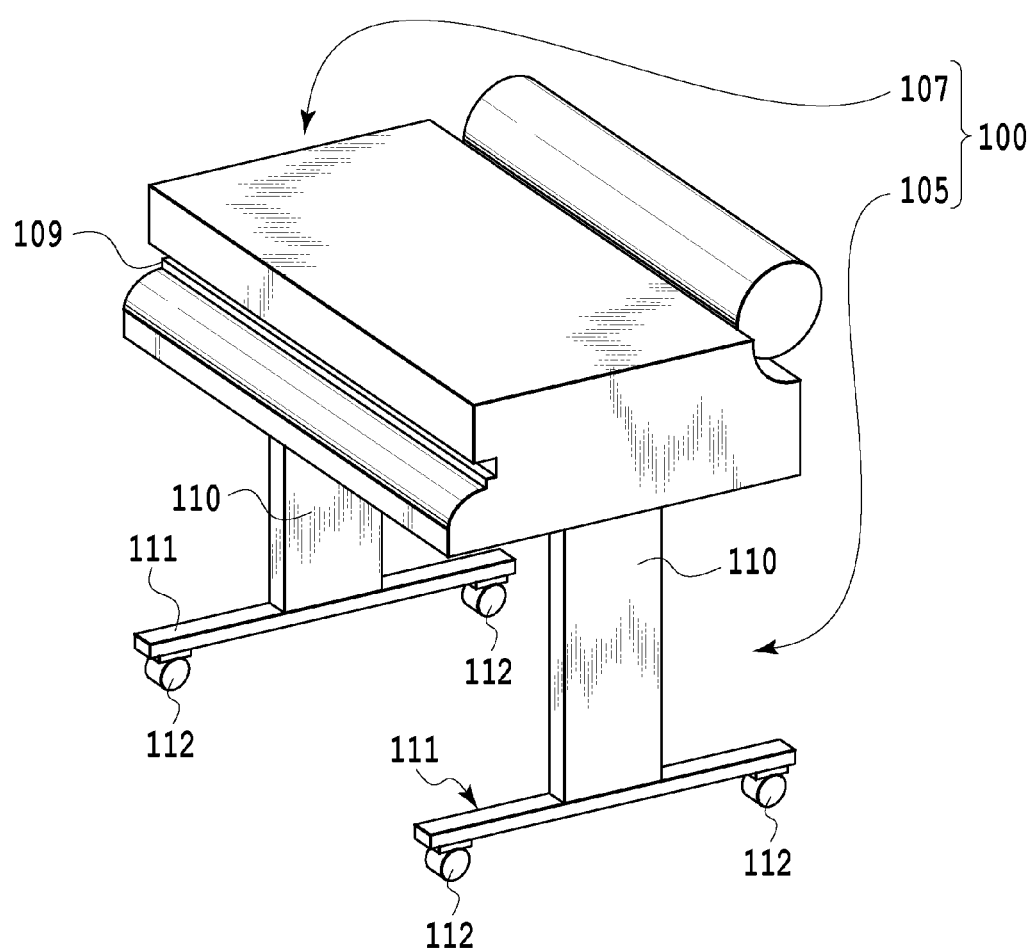
FIG. 3 is a perspective view illustrating the printer according to the first embodiment.

Next, the configuration of the printer 100 will be described with reference to FIG. 3. FIG. 3 is a perspective view illustrating the printer 100. As illustrated in FIG. 3, the printer 100 is constituted of a printer unit 107 and a printer stand unit 105.

The printer unit 107 is provided with the printer opening 109 for discharging the sheet. The printer unit 107 is disposed on the printer stand unit 105 that can freely move, and can freely move on the floor surface through user operations.

The printer stand unit 105 includes printer legs 110 disposed on the right and the left of the printer unit 107 so that the printer unit 107 is positioned at a certain height from the floor surface in consideration of operability.

In order to ensure stability, a printer foot 111 (base portion) having a sufficient length in the horizontal direction is connected at the lower part of each of the printer legs 110. A printer caster 112 that has a rotational structure and rolls on the floor surface to thereby move is disposed at both end portions of the printer foot 111. Therefore, the number of the printer casters 112 is four in total in the printer stand unit 105. Each of the printer casters 112 can move in all directions.

Figure 4:
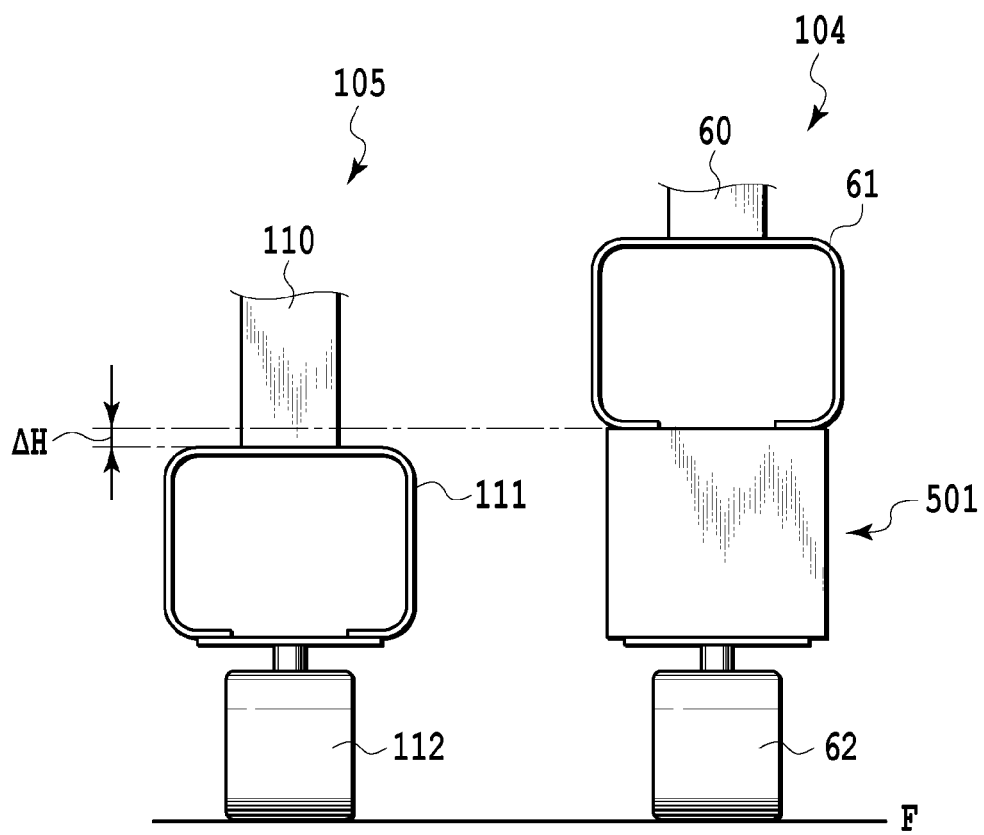
FIG. 4 is a diagram illustrating a stacker foot and a printer foot according to the first embodiment.

Next, with reference to FIG. 4, there will be described a state of the stacker stand unit 104 and the printer stand unit 105 in the case where the stacker 101 is attached to the printer 100. FIG. 4 is an elevation view illustrating portions in the vicinity of the respective feet 61 and 111 of the stacker stand unit 104 and the printer stand unit 105, when viewed in a direction (attachment direction X) toward the printer 100 from the stacker 101 in a state of being connected as illustrated in FIG. 1.

As illustrated in FIG. 4, the stacker foot 61 is disposed at a position higher than the printer foot 111 in such a manner that the lower surface of the stacker foot 61 is positioned higher than the upper surface of the printer foot 111.

The stacker caster 62 is in contact with the floor surface F. Therefore, there may be generated a situation in which the position of the stacker caster 62 changes upward or downward in the height direction due to the influence of unevenness of the floor surface F. In such a case, in accordance of this positional change, the relative positional relation of the stacker 101 with respect to the printer 100 in the height direction may change, thereby possibly leading to a situation in which the height of the stacker opening 108 does not correspond to that of the printer opening 109. At this time, there may be caused sheet conveyance troubles such as winding of sheets conveyed, damages including tearing of sheets, and sheet jamming in conveyance paths. In order to prevent the sheet conveyance troubles as described above, it is desirable to employ a configuration that is not affected by unevenness of the floor surface. The configuration for achieving this will be described with reference to FIG. 5 and FIG. 6A to FIG. 6C.

Figure 5:
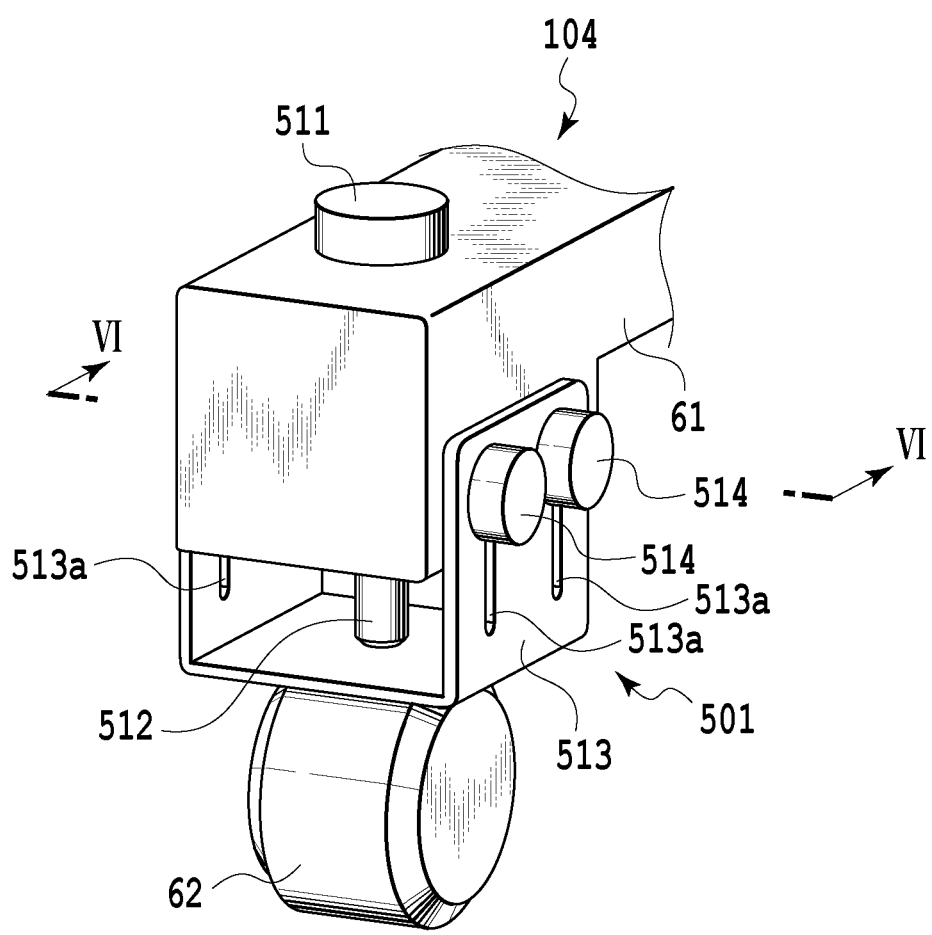
FIG. 5 is a perspective view illustrating a position adjusting unit according to the first embodiment.
Figure 6A:
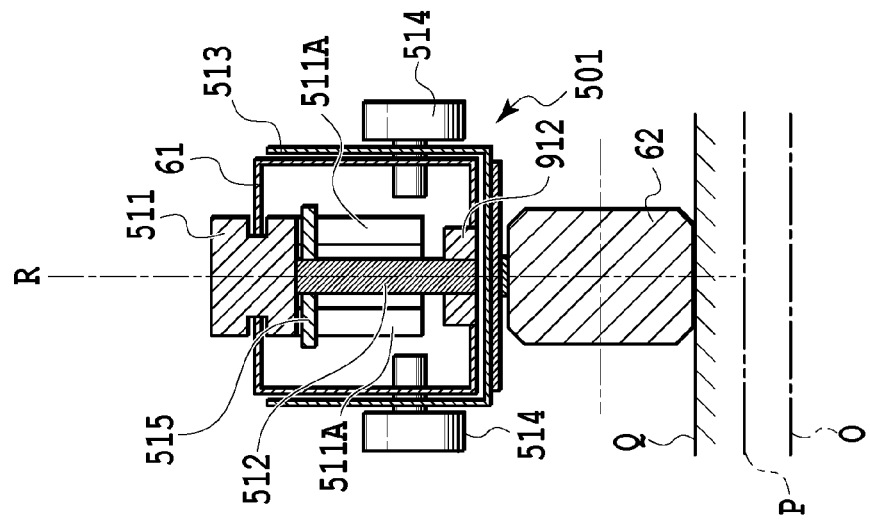
FIG. 6A to FIG. 6C are cross-sectional views for explaining the position adjusting unit according to the first embodiment.
Figure 6B:
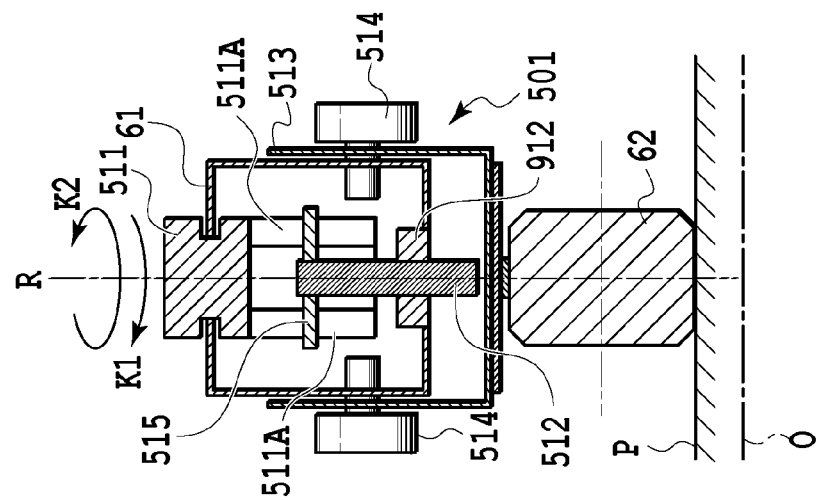
Figure 6C:
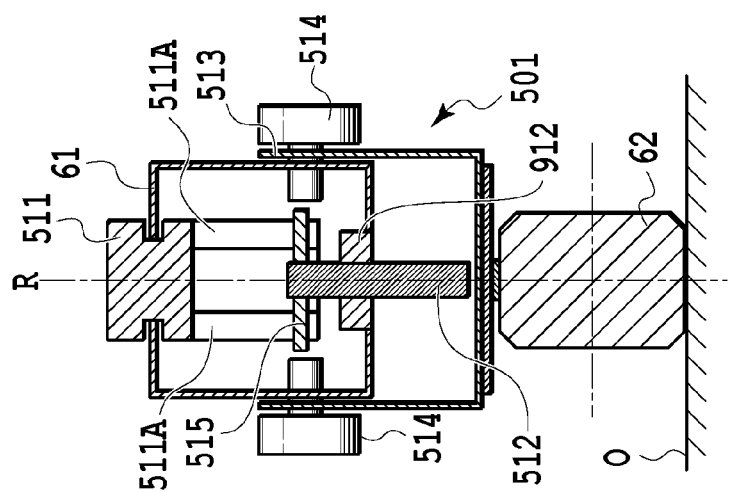

FIG. 5 is a perspective view illustrating the position adjusting unit 501. FIG. 6A to FIG. 6C are schematic cross-sectional views each illustrating the position adjusting unit 501. FIG. 6A illustrates a state where the stacker foot 61 is positioned by the position adjusting unit 501 at a height equal to the height of the upper limit of an adjustment range thereof. FIG. 6B illustrates a state where the stacker foot 61 is positioned by the position adjusting unit 501 at a height in the middle of the adjustment rage. FIG. 6C illustrates a state where the stacker foot 61 is positioned by the position-adjusting unit 501 at a height equal to the lower limit of the adjustment range thereof.

As illustrated in FIG. 5 and FIG. 6A to FIG. 6C, the position adjusting unit 501 includes a body 513 having a so-called U shape or C shape. The body 513 is attached to the stacker caster 62 in such a manner that the center part of the U-shape serves as the bottom surface and the opening end thereof faces upward in an operational posture, and that the relative position of the body 513 with respect to the stacker caster 62 does not change. Both side walls of the body 513 each have a through-hole 513a formed thereon so that the opening thereof extends in the height direction in the operational posture.

A fixing unit 514 is attached to the stacker foot 61 through the through-hole 513a of the body 513. For example, the fixing unit 514 serves as a male screw, and a female screw is formed on the side wall of the stacker foot 61, and thus the fixing unit 514 and the stacker foot 61 can be screwed with each other to thereby fix the relative position thereof. The fixing unit 514 is configured such that, during adjustment of positions, the fixing unit 514 can be moved along the through-hole 513a of the body 513 in a state of being fixed to the stacker foot 61. The fixing unit 514 can be configured such that, before or after the adjustment of positions, the side wall of the body 513 is held between the fixing unit 514 and the stacker foot 61 to fix the position of the body 513 by increasing the fastening degree of the fixing unit 514 to the stacker foot 61.

An adjustment knob 511 is rotatably attached to the stacker foot 61 in such a manner that the rotational center axis R of the adjustment knob 511 extends in the height direction in an operational posture. The adjustment knob 511 includes a portion protruding outside the stacker foot 61 along the rotational center axis R, and a cylindrical portion extending within the stacker foot 61. Two grooves 511A extending along the rotational center axis R are provided on the wall of the cylindrical portion in such a manner that these grooves are positioned at both ends of the diameter in cross-section.

The stacker foot 61 includes a nut 912 fixed to the inner-side bottom surface of the stacker foot 61, and an adjustment bolt 512 corresponding to the nut 912. A pin 515 is press-fitted at the upper part of the adjustment bolt 512. The pin 515 is configured so as to move along the groove 511A of the adjustment knob 511, thereby being able to move in a direction along the rotational center axis R of the adjustment bolt 512. The rotational force is transmitted through the pin 515 to rotate the adjustment bolt 512, by rotating the adjustment knob 511. At this time, the adjustment bolt 512 relatively moves with respect to the nut 912 to change the position of the stacker foot 61 in the direction along the rotational center axis R, thereby adjusting the position in the height direction.

The positional adjustment will be specifically described with reference to FIG. 6A to FIG. 6C. In the following description, the terms "up," "down," "height" and this kind of other terms indicating positions represent vertical positions in an operational posture unless otherwise specified.

The adjustment bolt 512 relatively moves downward with respect to the nut 912, by rotating the adjustment knob 511 toward the direction indicated by the arrow K1, from a state illustrated in FIG. 6B. At this time, the stacker foot 61 is pushed upward and reaches a state illustrated in FIG. 6A. In the case where a stacker caster 62 is positioned at a concave portion on the floor surface, the operation described above is performed on the position-adjusting unit 501 corresponding to this stacker caster 62, whereby it is possible to deal with the positional descent of the stacker foot 61 caused by concavity of the floor surface.

Furthermore, the adjustment bolt 512 relatively moves upward with respect to the nut 912, by rotating the adjustment knob 511 toward the direction indicated by the arrow K2, from the state illustrated in FIG. 6B. At this time, the position of the stacker foot 61 descends due to the weight of the stacker unit 106 body, and thus, reaches a state illustrated in FIG. 6C. In the case where a stacker caster 62 is positioned at a convex portion on the floor surface, the operation described above is performed on the position adjusting unit 501 corresponding to the stacker caster 62, whereby it is possible to deal with the positional ascent of the stacker foot 61 caused by the convex portion on the floor surface.

Namely, in the case where a floor surface condition at a portion where the stacker caster 62 is installed is in a convex shape with respect to a substantial plane, the adjustment knob 511 is rotated in the direction K2. On the contrary, in the case where the floor surface condition is in a concave shape with respect to the substantial plane, the adjustment knob 511 is rotated in the direction K1. It may be possible to combine the rotation in the direction K2 and the rotation in the direction K1 for the purpose of fine adjustment. With these operations, it becomes possible to adjust the position of the stacker foot 61 in the height direction even if the floor is largely uneven.

Figure 7A:
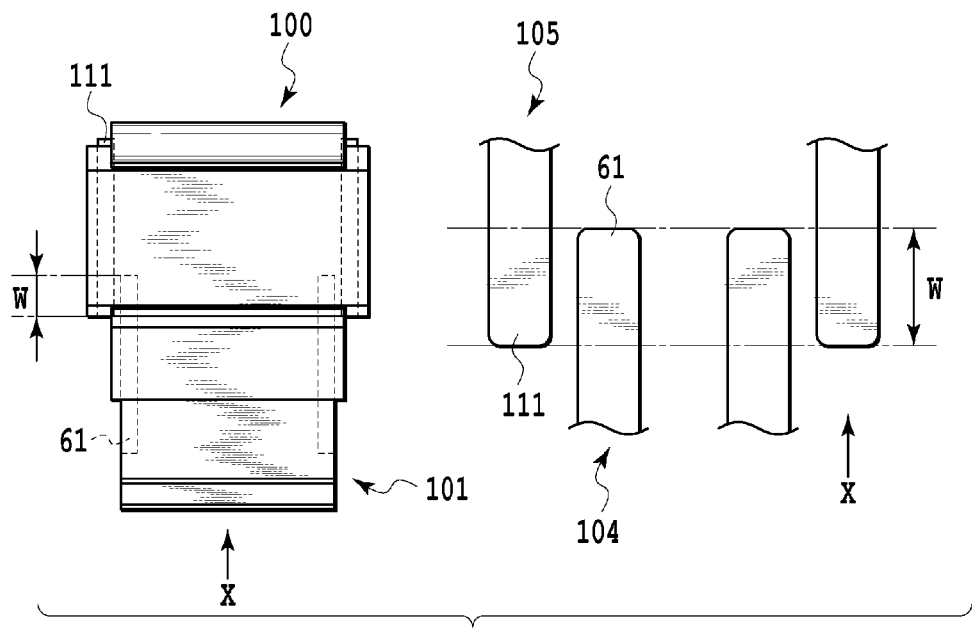
FIG. 7A and FIG. 7B are diagrams each illustrating a positional relationship between the printer and the stacker according to the first embodiment.
Figure 7B:
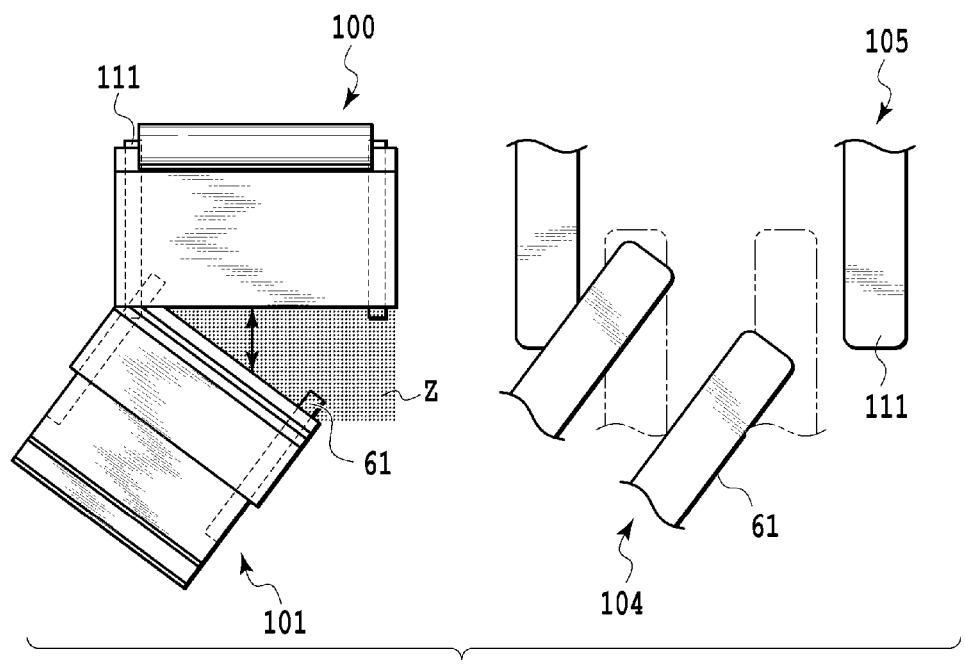

Next, with reference to FIG. 7A and FIG. 7B, there will be described positional relations between the stacker foot 61 and the printer foot 111 in the case where the stacker 101 is pulled out from the printer 100. FIG. 7A and FIG. 7B are schematic views each illustrating the stacker 101 and the printer 100 when viewed from the upper surface thereof. In each of FIG. 7A and FIG. 7B, the entire schematic view of the stacker 101 and the printer 100 is shown on the left-hand side in the drawing, and the partial schematic view of the stacker foot 61 and the printer foot 111 is shown on the right-hand side in the drawing.

FIG. 7A illustrates a state where the stacker 101 is attached to an attachment position in the printer 100. In this state, the stacker 101 directly faces the printer 100, and in this specification, the direction in which the stacker 101 directly faces the printer 100 is referred to as an attachment direction. In the mounting state, the stacker feet 61 and the printer feet 111 are arranged so as to have a region W where their positions overlap with each other in the attachment direction X. In this example, two stacker feet 61 are arranged between two printer feet 111.

FIG. 7B illustrates a state where the stacker 101 is diagonally pulled out from the printer 100. As described above with reference to FIG. 4, the stacker foot 61 and the printer foot 111 are configured so that positions thereof do not overlap with each other in the height direction. Therefore, in the case where the stacker 101 is rotated and is diagonally pulled out from the state illustrated in FIG. 7A to the state illustrated in FIG. 7B, the stacker foot 61 does not interfere with the printer foot 111, and moves above the printer foot 111. In this way, it is possible to secure a space Z in front of the printer 100.

As described above, the stacker foot 61 and the printer foot 111, arrangement positions of which overlap with each other in the attachment direction X in the attached state, are arranged in such a manner that positions thereof differ in the height direction. With this configuration, a user can diagonally pull out the stacker 101 in a state where the stacker foot 61 and the printer foot 111 do not interfere with each other when rotating the stacker 101. Accordingly, the user can create a required operation space with a minimum operation, even in the case where a need of an operation in front of the body of the printer 100 arises during the time when the user is operating at the side of the stacker 101.

Furthermore, the stacker foot 61 has the position adjusting unit 501 provided. With this configuration, it is possible to adjust the position of the stacker foot 61 in the height direction. Therefore, even in the case where the stacker 101 and the printer 100 are installed on a floor surface having large unevenness, positional misalignment between them in the height direction can be corrected, whereby the sheet can be correctly delivered and received.

The configurations of a stacker 101 (mounted apparatus) and a printer 100 (mounting apparatus) according to the second embodiment of the present invention will be described with reference to FIG. 8A, and FIG. 8B to FIG. 14.

The second embodiment is a modification of the configuration in the vicinity of the stacker foot 61 according to the first embodiment. The same reference signs are attached to the same constituent elements as those in the first embodiment, and explanation thereof will be omitted.

The position of the stacker 101 according to the second embodiment in the height direction can be adjusted using four position adjusting units 501 so as to correspond to unevenness of the floor surface, as described in the first embodiment. By moving the stacker 101 along the floor surface (installation surface), the state of unevenness of the floor surface where the stacker caster 62 is positioned changes before and after the movement, which possibly requires the position in the height direction to be re-adjusted after the movement. Therefore, the configuration for saving the trouble of such re-adjustment will be described with reference to FIG. 8A, and FIG. 8B to FIG. 11.

Figure 8A:
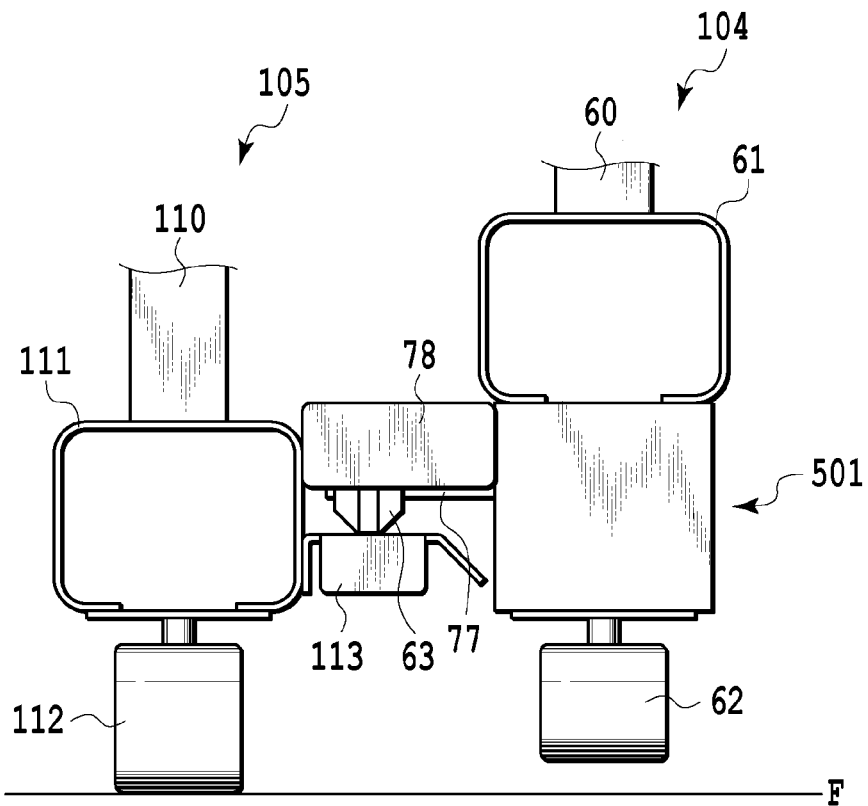
FIG. 8A and FIG. 8B are diagrams each illustrating a stacker foot and a printer foot according to a second embodiment.

With reference to FIG. 8A and FIG. 8D, there will be described a state of the stacker stand unit 104 and the printer stand unit 105 in the case where the stacker 101 is attached to the printer 100. FIG. 8A is an elevation view illustrating portions in the vicinity of the feet (base portions) 61 and 111 of the stacker stand unit 104 and the printer stand unit 105, respectively, when viewed in the attachment direction of the stacker 101 and the printer 100 in a state of being attached to each other. In addition, FIG. 8B is a partially perspective view illustrating the stacker stand unit 104 and the printer stand unit 105.

Figure 8B:
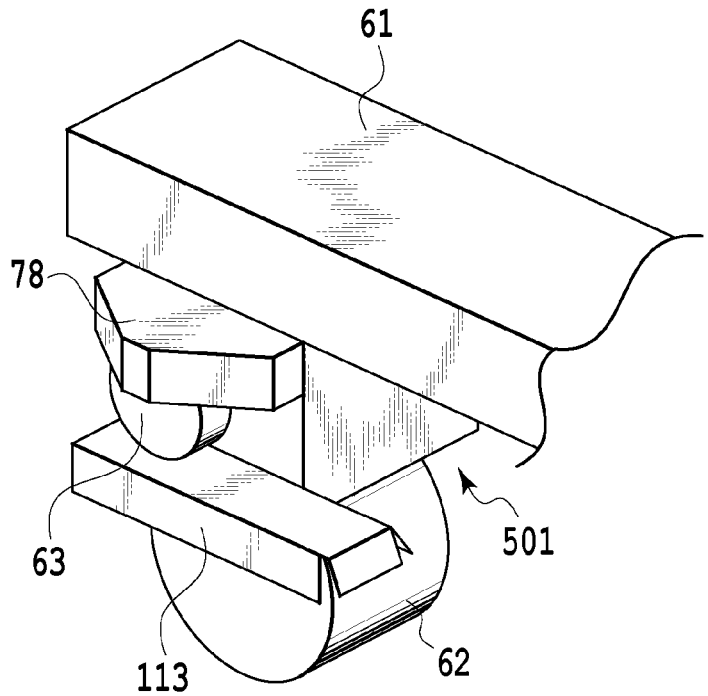

As illustrated in FIG. 8A and FIG. 8B, the stacker stand unit 104 has a guide member 78, a stacker roller 63, and a stacker roller shaft 77. In addition, the printer stand unit 105 has a roller receiving base 113. In FIG. 8B, the printer stand unit 105 is illustrated in such a manner that the constituent elements other than the roller receiving base 113 are omitted.

The guide member 78 is a member for guiding the stacker 101 to a predetermined position in the case where the stacker 101 is attached to the printer 100. The guide member 78 is provided on the side surface portion of the position adjusting unit 501 located substantially immediately below the stacker opening 108, so as to protrude toward the outside of the stacker stand unit 104. With the configuration as described above, the guide member 78 faces the printer foot 111 of the printer stand unit 105 during the process in which the stacker 101 is attached to the printer 100.

The stacker roller 63 is a rotatable roller that freely rotates. The stacker roller 63 is attached on the side surface portion of the position adjusting unit 501 through the stacker roller shaft 77 so as to be positioned immediately below the guide member 78.

The roller receiving base 113 is a base portion (supporting portion) for receiving and supporting the stacker roller 63, on its upper surface 114. The roller receiving base 113 is provided at the side surface portion of the printer foot 111 located substantially immediately below the printer opening 109, so as to protrude toward the inside of the printer stand unit 105. It is possible that the roller receiving base 113 is configured by having inclined surfaces on the upstream side thereof in the mounting direction and on the side portion thereof, so as to make the stacker roller 63 easily run on the upper surface 114 in the case where the stacker 101 is attached to the printer 100.

Figure 9:
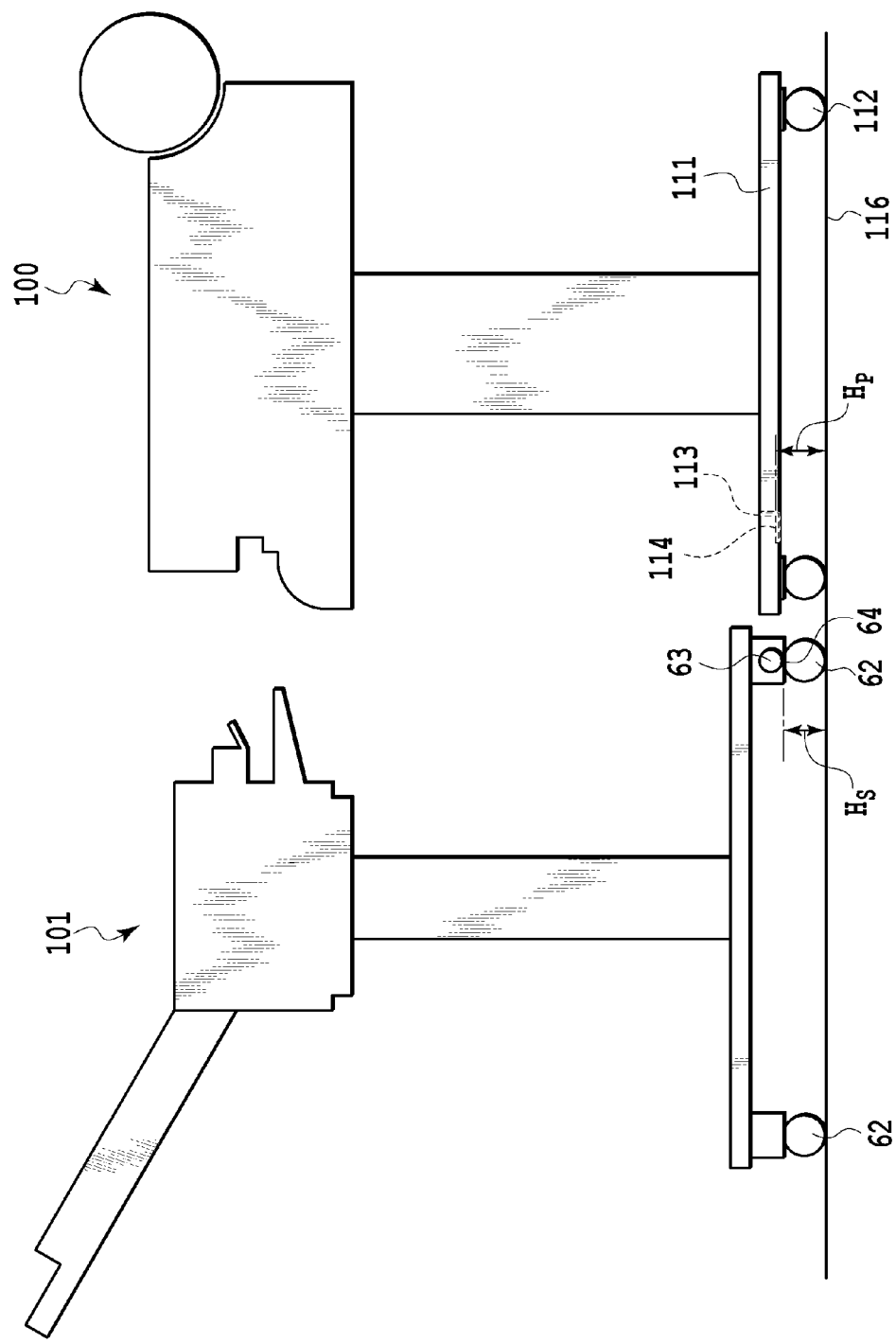
FIG. 9 is a side view illustrating a printer and a stacker according to the second embodiment in the case where they are spaced apart from each other.

With reference to FIG. 9, there will be described a state where the stacker 101 and the printer 100 are spaced apart from each other. FIG. 9 is a side view illustrating the stacker 101 and the printer 100 in a state of being spaced apart from each other.

As illustrated in FIG. 9, the stacker caster 62 is in contact with the floor surface 116 in a state where the stacker 101 and the printer 100 are spaced apart from each other. Here, the lowest point 64 of the stacker roller is a portion (a portion where the stacker roller 63 is in contact with the upper surface 114) of the stacker roller 63 located closest to the floor surface 116, and the distance from the lowest point 64 of the stacker roller to the floor surface 116 is a roller height Hs. Furthermore, the distance from the upper surface 114 of the roller receiving base 113 to the floor surface 116 is a receiving-base height Hp. At this time, the roller height Hs and the receiving-base height Hp have a magnitude relation expressed in Formula (I) described below.

$$Hs < Hp \qquad (I)$$

Next, with reference to FIG. 10, a state where the stacker 101 is attached to the printer 100 will be described. FIG. 10 is a side view illustrating the stacker 101 and the printer 100 in a state of being attached to each other.

As illustrated in FIG. 10, the stacker roller 63 has run on the upper surface 114 of the roller receiving base 113 in a state where the stacker 101 is attached to the printer 100. On the premise that the stacker roller 63 has run on the upper surface 114, the stacker 101 and the printer 100 are configured so that the stacker opening 108 and the printer opening 109 are both located substantially at the same height. With this configuration, the sheet between the stacker and the printer can be correctly delivered and received.

Here, the magnitude relation expressed in Formula (I) described above exists between the roller height Hs and the receiving-base height Hp. Accordingly, when the stacker roller 63 runs on the roller receiving base 113, the stacker caster 62 is thus spaced apart from the floor surface 116. Namely, the stacker caster 62 located closer to the printer 100 in the mounting direction X is not affected by unevenness on the floor surface 116. Note that, at this time, the printer caster 112 maintains contact with the floor surface 116.

Next, with reference to FIG. 11, there will be described a state where the stacker 101 is attached to the printer 100 at a location where a convex portion exists on the floor surface 116 on which the stacker 101 and the printer 100 are located. FIG. 11 is a side view illustrating the stacker 101 and the printer 100 in a state of being attached to each other in the case where a convex portion exists on the floor surface 116.

As illustrated in FIG. 11, in this example, a portion 117 having a convex shape (hereinafter, also simply referred to as a convex portion) exists on the floor surface 116. The printer 100 is installed in such a manner that the printer caster 112 located closer to the stacker 101 in the mounting direction X has run on the convex portion 117 on the floor surface 116. In this case, the roller height Hs' is greater, due to the influence of the convex portion 117, than the roller height Hs that is the height at the time no convex portion 117 exists on the floor surface 116, where Hs' is a roller height of the stacker roller 63 that has run on the upper surface 114 of the roller receiving base 113. Namely, the magnitude of separation from the stacker caster 62 to the floor surface 116 increases due to the influence of the convex portion 117.

Here, as described above, the stacker roller 63 and the roller receiving base 113 are positioned substantially immediately below the stacker opening 108 and the printer opening 109, respectively. Therefore, the relative position of the printer opening 109 with respect to the stacker opening 108 substantially remains unchanged in the case where the stacker roller 63 runs on the roller receiving base 113, and the stacker opening 108 and the printer opening 109 each substantially have the same height.

With this configuration, even if the state of unevenness on the floor surface changes, it is possible to correctly deliver and receive the sheet without being affected by the change of unevenness. Furthermore, it becomes possible to prevent conveyance troubles such as winding of sheets conveyed, damages including tearing of sheets, and sheet jamming.

Note that, in a strict sense, as the height of the convex portion 117 increases, there is generated a certain changes such as an increase in the distance between the stacker opening 108 and the printer opening 109 in the attachment direction X. However, it is possible to deal with this by height adjustment using the position-adjusting unit 501 of the stacker 101.

Figure 12A:
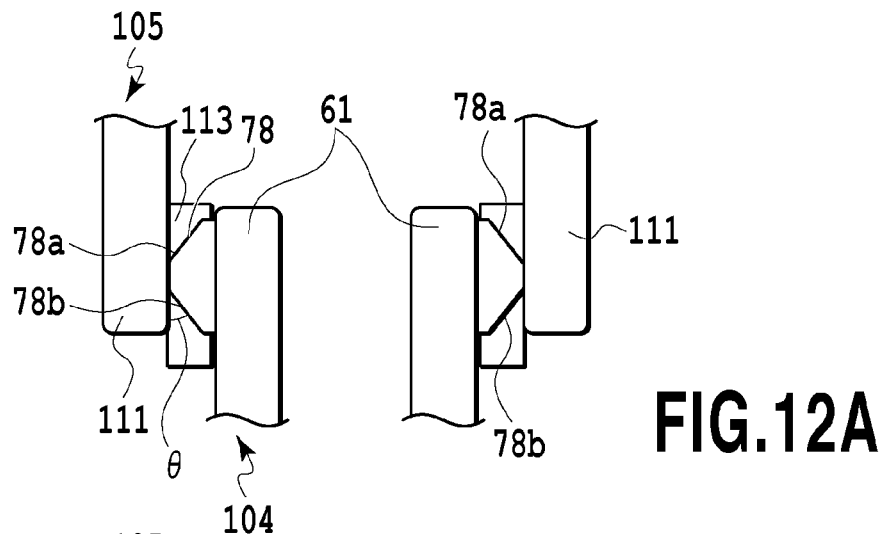
FIG. 12A to FIG. 12C are diagrams each illustrating an operation in which the stacker according to the second embodiment is pulled out from the printer.
Figure 12B:
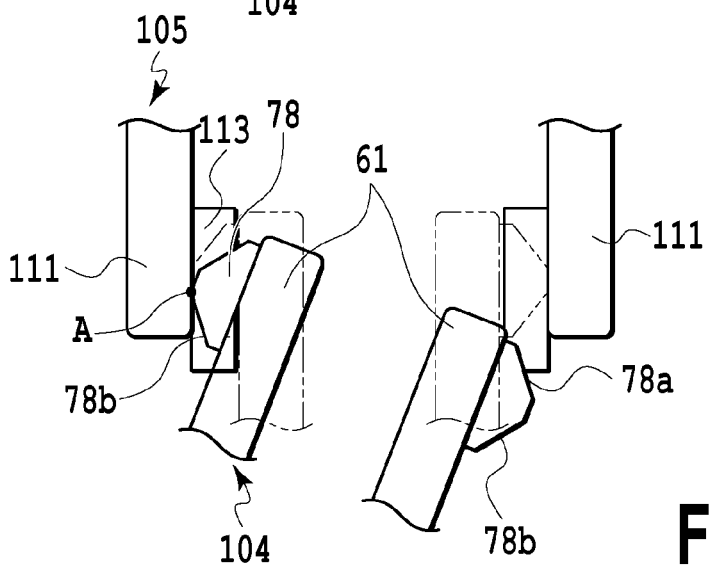
Figure 12C:
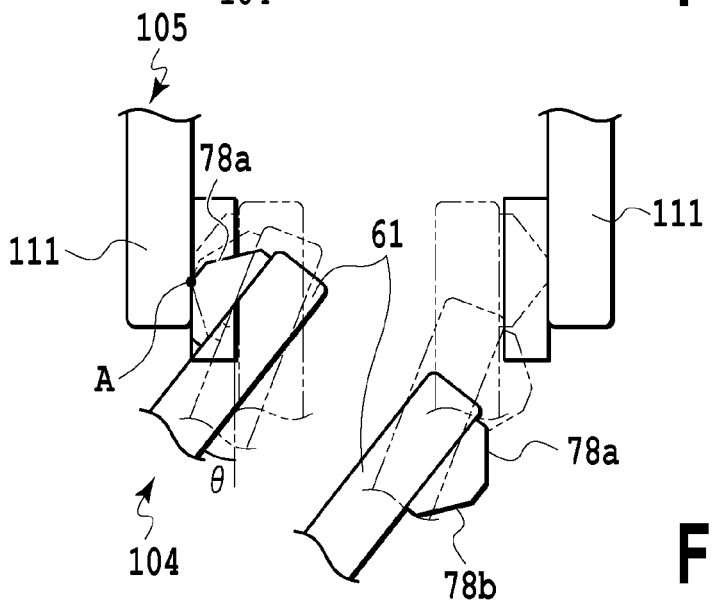

Next, with reference to FIG. 12A to FIG. 12C, there will be described a positional relation between the stacker foot 61 and the printer foot 111 in the case where the stacker 101 is diagonally pulled out. FIG. 12A to FIG. 12C are partial top views illustrating the stacker foot 61 and the printer foot 111. FIG. 12A illustrates a state where the stacker 101 is attached to the printer 100. FIG. 12B illustrates a state where the stacker 101 is in the middle of being diagonally pulled out. FIG. 12C illustrates a state where the stacker 101 is diagonally pulled out.

As illustrated in FIG. 12A, two guide members 78 are provided on the side surfaces of the right and left position-adjusting units 501 so as to face side surfaces of two printer feet 111 in an attached state. The guide members 78 each include a first end surface 78a and a second end surface 78b, and the first end surface 78a and the second end surface 78b are each inclined at an angle θ with respect to the side surface of the stacker foot 61.

In this example, the side surface of the stacker foot 61 and the side surface of the printer foot 111 that faces the side surface of the stacker foot 61 in the attached state are provided so as to be in parallel with each other in the attached state. Therefore, the first end surface 78a and the second end surface 78b are inclined at an angle θ with respect to the side surface of the printer foot 111 in the attached state. The first end surface 78a and the second end surface 78b are set to have the same inclination angle in order to rotate the stacker 101 or incline the direction of the stacker 101 on the floor surface, in a similar manner, toward both right and left directions.

Furthermore, two roller receiving bases 113 are provided on the side surfaces of the right and left printer feet 111 such that the roller receiving bases 113 and printer feet 111 face each other.

As illustrated in FIG. 12B, in the case where the stacker 101 is diagonally pulled out from the attached state, the stacker 101 starts to rotate about a contact point A between the guide member 78 and the printer foot 111.

As illustrated in FIG. 12C, in the case where the stacker 101 is rotated and the second end surface 78b serving as inclined surface of the guide member 78 is joined to the side surface of the printer foot 111, the stacker 101 rotates by the angle θ from the posture in the attached state illustrated in FIG. 12A. Namely, the inclination angle of the end surface of the guide member 78 is equal to the maximum rotation angle set to the stacker 101 in the case where the stacker 101 attached is pulled out from the printer 100.

In order to ensure a desired space Z with a minimum operation in the case where a user pulls out the stacker 101, it is necessary to rotate the stacker 101 by a predetermined angle having a certain degree. In the present embodiment, this predetermined angle is set to 35° (θ=35°) as one non-limiting example.

For example, in a printer corresponding to a sheet having a width of 44 inches (1117.6 mm), in the case where the stacker 101 is pulled out by rotation of the stacker 101 by an angle of 35°, a space with approximately 400 mm can be ensured in the vicinity of the center of the printer. This space is sufficient in order that the user may perform operations for exchange or the like of sheets, heads, and ink tanks. In addition, in the case where the angle by which the stacker 101 is rotated to be pulled out is less than 35° (θ<35°), there is a possibility of not being able to ensure sufficient spaces. Furthermore, in the case where the angle by which the stacker 101 is rotated to be pulled out exceeds 35° (θ>35°), the rotating range at the time of pulling out the stacker is large, which requires a large space for installing the printer 100 and the stacker 101. Therefore, in this example, the predetermined angle for the stacker 101 to be rotated is set to 35°.

Furthermore, the stacker roller 63 may drop off from the roller receiving base 113, in the case where the stacker 101 is rotated at an angle larger than the predetermined angle, or the stacker 101 is moved in parallel in the horizontal direction that is different from the rotational direction of the stacker roller 63, in a posture where the direction of the stacker 101 is inclined with respect to the attachment direction X. In such a case, there might be generated a trouble of temporarily moving the stacker 101 to the front of the printer 100 while correcting the inclined posture, and then, attaching the stacker 101 to the printer 100 again. Therefore, it is desirable to easily return the stacker roller 63 onto the roller receiving base 113, and the configuration for achieving this operation will be described with reference to FIG. 13A and FIG. 13B.

Figure 13A:
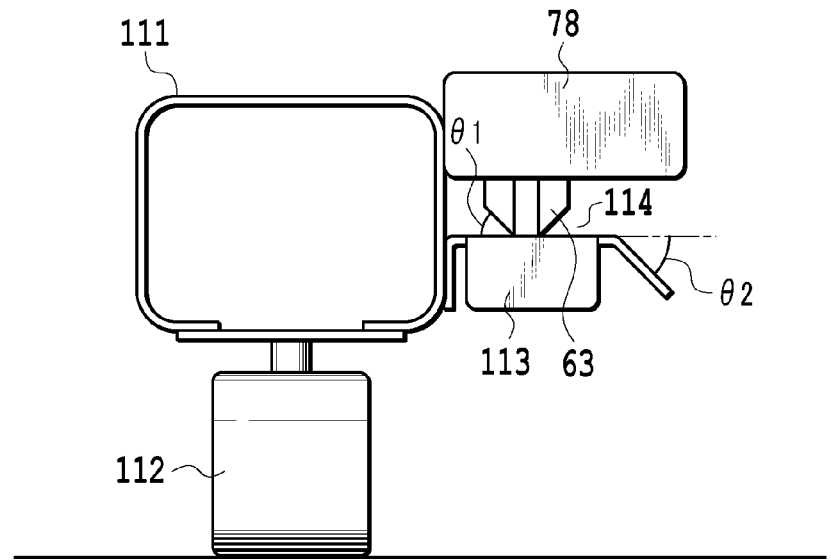
FIG. 13A and FIG. 13B are diagrams each illustrating a stacker roller and a roller receiving base according to the second embodiment.
Figure 13B:
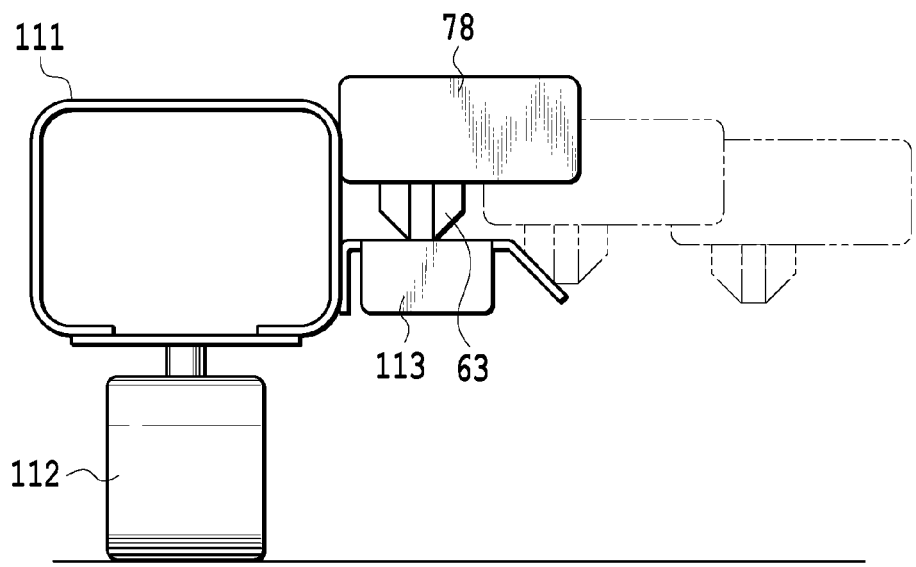

FIG. 13A and FIG. 13B are elevation views illustrating respective portions in the vicinity of the stacker roller 63 and the roller receiving base 113 when viewed in the attachment direction. FIG. 13A illustrates a state where the stacker roller 63 has run on the roller receiving base 113. FIG. 13B illustrates a situation in which the stacker roller 63, which dropped off, is returned onto the roller receiving base 113.

As illustrated in FIG. 13A, the end portions of the stacker roller 63 are chamfered at an angle $\theta1$. Furthermore, the side surface of the roller receiving base 113 located closer to the stacker foot 61 is inclined at an angle $\theta2$ with respect to the upper surface 114 of the roller receiving base 113. It is possible to make the dropped-off stacker roller 63 easily return onto the roller receiving base 113, by making the end portion of the stacker roller 63 and the side surface of the roller receiving base 113 inclined.

Here, in the present embodiment, the angle $\theta1$ and the angle $\theta2$ are set to $\theta1=45°$ and $\theta2=45°$, respectively, as one non-limiting example.

In the case where the angle $\theta1$ is increased, it is more likely to be difficult for the dropped off stacker roller 63 to run on the roller receiving base 113, and to return. On the other hand, in the case where the angle $\theta1$ is decreased, the length of the inclined portion in the height direction is more likely to become short, and it is necessary to increase the size of the stacker roller 63 in order that the stacker roller 63 may go up the inclined surface having a certain height.

Furthermore, in the case where the angle $\theta2$ is increased, the dropped-off stack roller 63 tends to become hard to return onto the roller receiving base 113. On the other hand, in the case where the angle $\theta2$ is decreased, the length of the side surface of the roller receiving base 113 protruding in a direction along the floor surface increases, thereby possibly leading to interference of the stacker 101 with the roller receiving base 113 at the time of attachment of the stacker 101. Therefore, the angle $\theta1$ and the angle $\theta2$ have desirable values, and in this example, the angle $\theta1$ and the angle $\theta2$ are both set to 45° as one example.

According to this setting, even if the stacker roller 63 drops off from the roller receiving base 113, the stacker roller 63 can move along the inclined surface of the roller receiving base 113 and easily return onto the roller receiving base 113, as illustrated in FIG. 13B.

The angles $\theta$, $\theta1$, and $\theta2$ are not limited to the examples described above, and it is sufficient to select an angle appropriate for an apparatus to which the present invention is applied.

As described above, in the second embodiment, the stacker roller 63 is configured so as to run on the roller receiving base 113 in the case where the stacker 101 is attached to the printer 100. Therefore, it is possible to adjust the relative position of the printer opening 109 and the stacker opening 108 without being affected by unevenness of the floor surface, whereby it is possible to correctly deliver and receive the sheet.

In the second embodiment, by provision of the guide members 78, it becomes easy, by rotation, to diagonally pull out the stacker 101 in a posture of directly facing the printer 100, and to return the stacker 101 from the posture of being pulled out to the posture of directly facing the printer 100.

Figure 14:
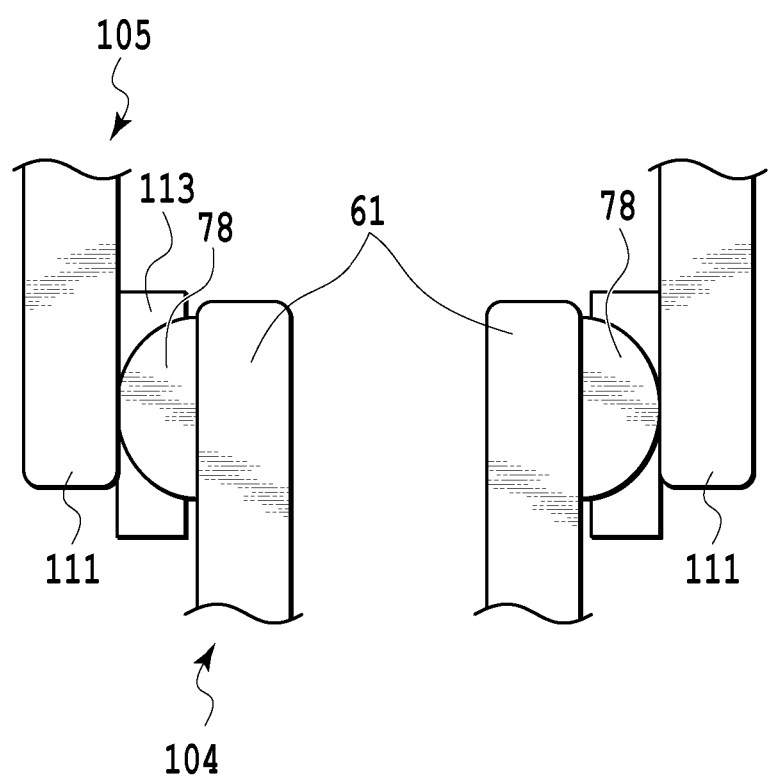
FIG. 14 is a top view illustrating a modification of a guide member according to the second embodiment.

In the second embodiment, the region of the guide member 78 that can be brought into contact with the printer foot 111 has a polygonal geometry when viewed from the direction perpendicular to the floor surface. With this configuration, it is possible to rotate about a contact point corresponding to a vertex of the polygonal geometry or contact line, whereby it becomes easy to diagonally pull out the stacker 101. Furthermore, the configuration is not limited to that described above, and in the present invention, the region of the guide member 78 that can be brought into contact with the printer foot 111 may be formed into an arc geometry as illustrated in FIG. 14 when viewed from the direction perpendicular to the floor surface.

In the second embodiment, the stacker roller 63 is configured to have an inclined surface that is inclined with respect to a direction along the stacker roller shaft 77, by chamfering the stacker roller 63. Furthermore, the roller receiving base 113 is provided with an inclined surface that extends from the upper surface 114 of the roller receiving base 113 and is inclined with respect to the upper surface 114 in such a manner that the height thereof decreases along with increase in distance from the side surface of the printer foot 111 where the roller receiving base 113 is provided. With this configuration, even if the stacker roller 63 drops off from the roller receiving base 113, the stacker roller 63 easily returns. Moreover, the configuration is not limited to that described above, and in the present invention, the stacker roller 63 may have a spherical geometry. In addition, the stacker roller 63 may not be a rotational member such as a roller, and may be a sliding member as long as the weight of the mounted apparatus is not particularly heavy.

In the second embodiment, the configuration in which the stacker 101 runs on the printer 100 has been described. However, in the present invention, a configuration in which the printer 100 runs on the stacker 101 may be employed. With these configurations, the positions of the openings of the stacker 101 and the printer 100 are substantially equal without being affected by unevenness on the floor surface, and thus the sheet can be correctly delivered and received.

In the first and second embodiments, the configuration in which the stacker 101 is rotated and is diagonally pulled out has been described. However, it is natural that, in the present invention, a user who wishes to create a large working space can straightly pull out the stacker 101.

In the first and second embodiments, description has been made by giving the stacker 101 and the printer 100 as examples. However, the present invention can be applied to any mounted apparatus that is moved along an installation surface to thereby be detachably attached to a mounting apparatus, and to a system including the mounted apparatus and the mounting apparatus to which the mounted apparatus is detachably attached. For example, the mounted apparatus and the mounting apparatus may have a relationship in which one of the mounted apparatus and the mounting apparatus serves as a supplying apparatus including a supplying unit that supplies an item, and the other serves as a receiving apparatus including a receiving surface that receives the item.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-200727, filed Sep. 30, 2014, which is hereby incorporated by reference wherein in its entirety.

What is claimed is:

1. A stacking apparatus attachable to a printing apparatus, the stacking apparatus comprising:
a body;
a stacking apparatus base portion of the body having casters, the stacking apparatus being movable on an installation surface with the casters,
a joint portion configured to receive a printed sheet discharged from a discharge portion of the printing apparatus, wherein a height of the discharge portion corresponds to a height of the joint portion in a state where the stacking apparatus is attached to the printing apparatus; and
an adjusting mechanism for adjusting a position of the joint portion in the height direction,
wherein, in the state where the stacking apparatus is attached to the printing apparatus, the stacking apparatus base portion is disposed in a region where a part of the stacking apparatus base portion overlaps with a printing apparatus base portion of the printing apparatus with respect to an attachment direction, and the part of the stacking apparatus base portion is disposed at a position different from a position of the printing apparatus base portion in the height direction.

2. The stacking apparatus according to claim 1, further comprising:
a guide member that is brought into contact with the printing apparatus to thereby guide relative movement of the stacking apparatus with respect to the printing apparatus.

3. The stacking apparatus according to claim 2, wherein the guide member has a region adapted to be brought into contact with the printing apparatus, the region having an arc geometry or polygonal geometry when viewed from a direction perpendicular to the installation surface for the stacking apparatus.

4. The stacking apparatus according to claim 2, wherein the relative movement includes rotation.

5. The stacking apparatus according to claim 2, wherein the guide member is disposed on a side surface of the stacking apparatus so as to face the printing apparatus base portion in a state where the stacking apparatus is attached to the printing apparatus.

6. The stacking apparatus according to claim 1, wherein the stacking apparatus base portion comprises two foot portions each having two casters, and
the printing apparatus base portion comprises two foot portions each having two casters.

7. The stacking apparatus according to claim 1, wherein, in the state where the stacking apparatus is attached to the printing apparatus, at least one of the casters corresponding to the part of the stacking apparatus base portion floats above the installation surface.

8. The stacking apparatus according to claim 1, wherein the adjusting mechanism adjusts a position of each of the casters with respect to the body in the height direction.

9. The stacking apparatus according to claim 1, wherein the printing apparatus is a large format inkjet printer, and the stacking apparatus is a stacker for stacking printed sheets printed by the printing apparatus.

10. A printing apparatus attachable to a stacking apparatus, the printing apparatus comprising:
a body;
a printing apparatus base portion of the body having casters, the printing apparatus being movable on an installation surface with the casters; and
a discharge portion configured to discharge a printed sheet to a joint portion of the stacking apparatus, wherein a height of the discharge portion corresponds to a height of the joint portion in a state where the stacking apparatus is attached to the printing apparatus,
wherein, in the state where the printing apparatus is attached to the stacking apparatus, the printing apparatus base portion is disposed in a region where a part of the printing apparatus base portion overlaps with a stacking apparatus base portion of the stacking apparatus with respect to an attachment direction, and the part of the printing apparatus base portion is disposed at a position that does not interfere with the stacking apparatus base portion in the height direction.

11. A system comprising:
a first apparatus including a first base portion, the first apparatus being movable on an installation surface with casters; and
a second apparatus to which the first apparatus is detachably attached, the second apparatus including a second base portion, wherein,
in a state where the first apparatus is attached to the second apparatus, the first base portion is disposed in a region where a part of the first base portion overlaps with the second base portion with respect to an attachment direction, and the part of the first base portion which overlaps with the second base portion is disposed at a position different from a position of the second base portion in a height direction,
in a state where the first apparatus is attached to the second apparatus, the second base portion is provided with a supporting unit having an upper surface that supports the part of the first base portion,
the first base portion is provided with a contact unit adapted to be brought into contact with the upper surface of the supporting unit,
the first base portion is positioned on the upper surface of the contact unit, thereby being supported by the supporting unit, and
a side surface of the supporting unit extending from the upper surface is an inclined surface having a height from the installation surface decreasing with an increase in distance from the upper surface.

12. The system according to claim 11, wherein the first apparatus is a stacking apparatus and the second apparatus is a printing apparatus.

* * * * *